United States Patent
Hawkes (10) Patent No.: US 7,739,512 B2
(45) Date of Patent: Jun. 15, 2010

(54) METHOD AND APPARATUS FOR INTERNET WEB SITE ACCREDITATION

(75) Inventor: Michael Hawkes, Endon (GB)

(73) Assignee: Tradesafely.com Limited, Manchester (GB)

( * ) Notice: Subject to any disclaimer, the term of this patent is extended or adjusted under 35 U.S.C. 154(b) by 1628 days.

(21) Appl. No.: 10/204,806

(22) PCT Filed: Feb. 22, 2001

(86) PCT No.: PCT/GB01/00754

§ 371 (c)(1),
(2), (4) Date: Oct. 31, 2003

(87) PCT Pub. No.: WO01/63878

PCT Pub. Date: Aug. 30, 2001

(65) Prior Publication Data

US 2008/0196084 A1   Aug. 14, 2008

(30) Foreign Application Priority Data

Feb. 23, 2000  (EP)  ................................. 00301409
Feb. 23, 2000  (GB)  ................................. 0004304.2

(51) Int. Cl.
  G06F 21/00  (2006.01)
  G06F 7/04   (2006.01)
(52) U.S. Cl. .............................. 713/182; 726/4; 726/27; 726/28; 726/29
(58) Field of Classification Search ................. 713/189, 713/182; 726/4, 27–29
See application file for complete search history.

(56) References Cited

U.S. PATENT DOCUMENTS 5,841,970 A   11/1998 Tabuki (Continued)

FOREIGN PATENT DOCUMENTS

EP   0 936 531   8/1999

(Continued)

OTHER PUBLICATIONS

Verisign Secure Site Seal—www.verisign.com/prg/seal/install.htm Copyright 1999.

Primary Examiner—Nasser Moazzami
Assistant Examiner—Mohammad W Reza
(74) Attorney, Agent, or Firm—Fish & Richardson P.C.

(57) ABSTRACT

To authenticate an Internet web site, the web site is verified each time it is accessed by a user browser (12). On receipt of a page request, the web site generates a web page into which is embedded a URL site address or other unique identifier. A cookie, link to an image or java applet or similar, for execution of the verification process may also be embedded or may be resident on the user browser. At the user, the browser instantiates the cookie, link to image or applet and extracts the URL site address or unique identifier which is sent, together with user ID to a verification server (16). The server performs comparison, comparing the URL address or unique identifier with a record of the correct identifier and/or URL address. Based on the comparison, an approval status is generated and sent back to the browser. This is displayed as a graphic in the browser or in any other way. The graphic includes an animated portion to increase security. The graphic also includes a user generated code or challenge which is stored on the verification server and which is sent back to the user upon successful authentication.

21 Claims, 5 Drawing Sheets

U.S. PATENT DOCUMENTS

| | | | |
|---|---|---|---|
| 5,892,904 A | | 4/1999 | Atkinson et al. |
| 5,968,119 A | | 10/1999 | Stedman et al. |
| 6,018,724 A | | 1/2000 | Arent |
| 6,018,801 A | * | 1/2000 | Palage et al. .................. 726/2 |
| 6,023,764 A | | 2/2000 | Curtis |
| 6,029,245 A | | 2/2000 | Scanlan |

FOREIGN PATENT DOCUMENTS

| | | |
|---|---|---|
| EP | 0 936 531 A2 | 8/1999 |
| EP | 936531 A2 * | 8/1999 |
| EP | 0 936 531 A3 | 5/2002 |
| JP | 11175474 | 7/1999 |

* cited by examiner

METHOD AND APPARATUS FOR INTERNET WEB SITE ACCREDITATION

FIELD OF THE INVENTION

This invention relates to Internet web site accreditation; that is the verification that a site on the World Wide Web (www) is bona fide.

BACKGROUND OF THE INVENTION

In recent years, e-commerce, the business of trading across the Internet has grown very rapidly and growth is forecast to continue growing rapidly. This growth has brought with it problems in security and authenticity. Many web sites exist which purport to be the genuine source for goods but which are actually bogus, either selling counterfeit goods of being an unauthorised source for genuine goods.

It is presently very easy for a bogus third party to register an Internet domain name which is identical or very similar to a well known brand. Internet search engines will find these similar IP addresses and take browsers to any site bearing a close resemblance in name or page content. Thus is the correct, legitimate address is bloggsandbloke.com it is very common to find unrelated addresses such as bloggs+bloke.com, bloggs-bloke.com, bloggsandbloke.co.uk etc.

It is equally easy to lift the front page of the genuine web site of bloggsandbloke.com and import it onto the rogue site. As result, browsers, and their users, think that they are in the genuine site of Bloggs and Bloke PLC, when, in reality, they are visiting a rogue site.

In the past attempts have been made to authenticate web sites to give customers a degree of security. However, all authentication systems have been static; a given web site is authenticated in advance and can display an authentication symbol, for example, an authentication logo, typically on its home page. The authentication symbol is displayed automatically every time that site is accessed. Whilst such systems offer a degree of consumer protection, there are far from infallible. Not only can authentication symbols be copied, the accreditation cannot take into account changes made to a web site's content or the site provider. If the front page has been copied the unlawful copies will also include the authentication.

Security mechanisms already exist to allow safe (encrypted) transfer of information such as credit card numbers etc. However, these systems merely provide an encryption mechanism and offer no guarantee as to the authenticity of the site.

There is, therefore, a need for an improved system for accreditation and authentication of Internet web sites. The invention aims to meet this need and, in its broadest form, provides a method of dynamic authentication in which authentication takes place each time the site is accessed by a remote user.

In its broadest form, the invention provides a method, apparatus and programme which ensures that the web site is verified by a verification server each time it is accessed. More specifically there is provided a method of verifying the authenticity of an Internet web site comprising the steps of: sending a page request from a user to the site to be authenticated; at the site to be verified, generating a web page containing a site identification and sending the generated page to the user; at the user, extracting the site identification and sending it to a verification server; at the verification server, comparing the site identification with a pre-stored identification; and based on the comparison, indicating to the user whether or not the site is authentic, the indication including sending a predetermined user originated identifier back to the user.

The invention further provides a system for verifying the authenticity of an Internet web site comprising: at the site to be authenticated: means for generating a web page on receipt of a page request from a user browser, the generating means including means for embedding in the page a site identification; and means for sending the generated page to the user browser; at the user: means for extracting the site identification; and means for sending it to a verification server; at the verification server: means for comparing the site identification with a pre-stored identification; and means for, indicating to the user whether or not the site is authentic, based on the comparison, and, if authentic, returning a predetermined user originated identifier to the user.

The invention further provides a computer program comprising program code means for performing, when the program is run on a computer or a computer network, the steps of: on receipt of a page request from a remoter location, generating a web page containing a site identification and sending the generated page to the remote location; at the remote location, extracting the site identification and sending it to a verification server; receiving from the verification server at the remote location an indication of whether or not the site is authentic based on a comparison at the verification server of the site identification and a pre-stored identification; displaying at the remote location an identifier originating from the remote location if the site is authentic; and displaying at the remote location the indication received from the verification server.

Embodiments of the invention have the advantage that the front page of a web site cannot be lifted in such a manner that it carries the verification as the verification is generated every single time the web site is accessed and the user receives a user originated identifier which ensures that the verification signal originates from the authenticating server.

Preferably, the web page generated by the site to be verified has embedded within in it a unique identification number whereby the web page is unique. This has the advantage that the page will not be cached by an Internet Service Provider. Internet Service Providers generally only cache the most frequently visited sites as a means of cutting down response times. As the site is then not cached the authentication process cannot be bypassed by obtaining pages from the cache.

Preferably, the indication to the user of whether or not the site is authentic comprises a graphic display within the browser, or at least a portion of the browser. Preferably at least a part of this graphic is animated. Animation of a portion of the graphic makes it harder for the graphic to be copied.

The web page generated by the site to be authenticated may contain an applet or a cookie or a link to the verification server, which may be resident on that user's browser. The applet or cookie or link mechanism performs the functions of extracting site identification from the generated web page once it is received at the user's browser, communicating with the verification server, sending the verifying server a code or a challenge phrase, created by the user and generating the graphic display with the challenge phrase which is sent back to the user.

Preferably the applet handles each of the three operations mentioned above as separate concurrent threads.

BRIEF DESCRIPTION OF THE DRAWINGS

An embodiment of the invention will now be described, by way of example, and with reference to the accompanying drawings in which.

Figure 1:
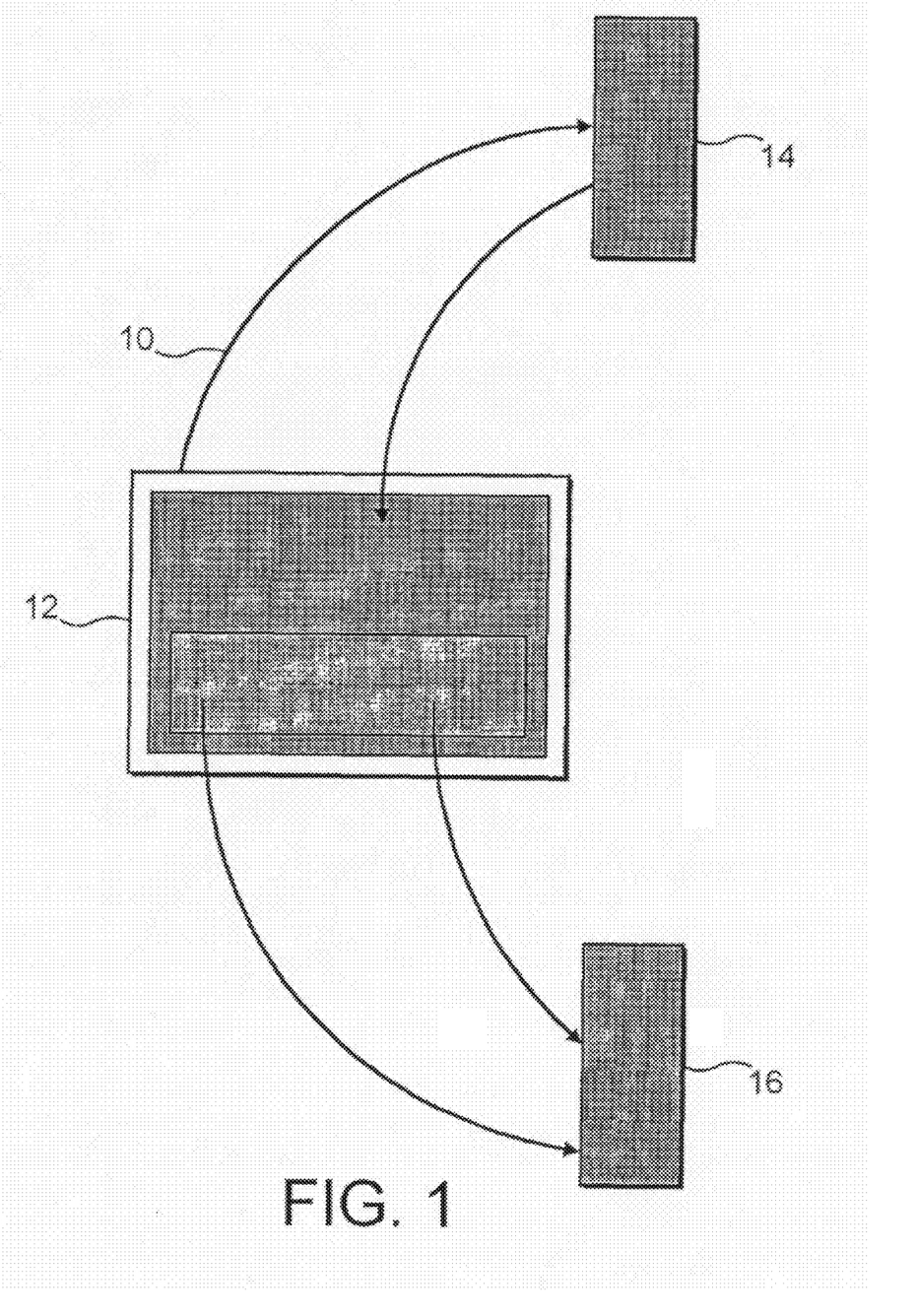
FIG. 1 is a schematic view of a system embodying the invention.

The system (10), illustrated in FIG. 1 comprises a user browser (12), which may be a conventional Internet browser such as Microsoft Internet Explorer or Netscape Navigator which may be modified to include a custom Java applet or cookie which will be described. The browser may run on any convenient platform such as a PC or Macintosh. The browser communicates with a corporate server 14 over a conventional Internet link via an Internet service provider (ISP) (not shown). In order to access the corporate server, which hosts the corporation's web site, the browser sends the conventional hypertext transfer Protocol (HTTP) address for the server and sends a page request. The authentication system to be described is based on the concept of the corporate server generating a fresh web page with a unique serial number and a java applet or cookie embedded in it. This web page is received at the user browser and the applet or cookie causes a verification request to be sent to authentication server 16 which is remote from the corporate server and which verifies the URL address and signals back to the user browser that the site has either been verified or that the verification has failed. The applet or cookie may be resident on the browser or may be downloaded each time from the corporate server embedded in the uniquely generated web page.

The system described enables verification that data received from a web site has come from an accredited source. Thus, the data delivered is provided by a certified data provider and the accreditation status is verified each time the web site is accessed. Once the site has been verified, the results of the verification process are made known to the Internet browser in a dynamic format, preferably a multi-layer dynamic format to make logo theft difficult. Furthermore, when the user communicates with verifying server, he sends a code or challenge phrase which then accompanies the verification logo, signs or signal when it is sent back to the user.

At each stage of the process, measures are included to prevent ISP caching mechanisms. This ensures that authentication is performed each time the site is accessed. For this reason, and as an additional safety measure, a unique serial number is provided by the corporate server a value which is unique and generated each time a page request is received.

The system will now be described in greater detail. The Internet browser (12) preferably uses one of two common protocols for information interchange: HTTP and CGI. Other protocols may be used. HTTP (Hypertext Transfer Protocol) is a simple to use protocol in which requests to a server are made in standard text and the initial responses are text only. The protocol is simple to implement and debug.

Common Gateway Interface (CGI) is a well known protocol used to generate composite documents. HTTP is a protocol for delivering of documents which have no real processing capabilities. To increase the usability of the World Wide Web, server-side programs are run that generate page content when required. These are often written in simple scripting languages. Data is passed to these server scripts via HTTP through the CGI. The server scripts convert incoming information from CGI standard text format into a more usable form using well known procedures.

It is common practice for ISP's to prove a local copy of popular web sites. The ISP then responds to page requests as if they had originated from the original provider. This caching process speeds up access to these sites' information. It will be understood that in the preferred embodiment of the invention, caching of authenticated sites is not possible as the method requires the actual corporate server to generate a unique code each time the site is accessed. Thus, a dynamic page is generated containing the authentication applet with each page being unique. The ISP is unable to cache the HTTP page request and the applet is therefore delivered from the publisher, the corporate server, rather than the ISP. Caching does not take place as the web page is unique and therefore not recognised by the ISP as one which is frequently accessed. This is also the case if the applet is resident on the browser.

To increase security still further, metatags may be provided in the corporate page to prevent attempts at caching by the ISP.

The system outlined above may also incorporate a system for the re-authorization of pre-authorised web sites each time the site is accessed. The pre-authorisation step is an off-line process performed by the verification authority. When the owner of the corporate server, the publisher, has satisfied the verifying authority that they are a genuine goods or service provider within the criteria to be set by the verifying authority, the publisher is registered and issued with a unique serial number and a script to generate the remaining data which, together with the serial number will be embedded in the web page generated when the corporate server is accessed. These two elements of the page serial number for a unique request number which will be delivered to the applet as a routine parameter.

Once established, the unique serial number is embedded in the page sent to the user browser as a parameter to the applet. The unique serial number may take the form:

<supplied serial number>-<UTC based integer>-[<CGI process ID or iteration count>].

An example of a unique identifier code is as follows:

Supplied Serial number (registration no): PDQ4567X

Current UTC time value when page requestion: 949424629

Current CGI process ID (or iteration count): 6541

The unique number generated is: PDQ4567X-949424629-6541.

This number provides the verifying authority with two pieces of verification data. The first is the registered publisher serial number which had been supplied by the verifying authority to the publisher, which is used as the primary key when performing site verification. If verification fails, the verification server can identify the source of the errant applet.

The optional second verification data is the time, according to the publisher, that the applet was delivered. This is stored at the verification server cache as the last time the applet was used. If a request us made with a substantially older time stamp, a security exception is raised and the request considered stale. Where a time stamp is only marginally older it will still be accepted as the routing path could have been more complex and a delayed legitimate request. The time is expressed as a Universal Time Code.

The iteration count is a number which automatically increments each time a page request is received and can wrap around at the maximum number of concurrent processes supported by the publisher's system architecture. Some systems cannot support an iteration count and a CGI process ID may be used instead each process ID number is unique. This may be used, for example, in UNIX based systems.

Where a request is stale, the applet forces a page reload from the original publisher to overcome local browser cache or user-connection problems.

The process will now be described in more detail with reference to FIG. 2. In the following description, it is assumed that the site to be accessed has already been assigned a serial number by the verifying authority.

At step 100, a page delivery script in CGI Script is sent from the Internet browser (12), to the corporate web-server (14).

The web-server receives the page delivery request and performs the steps necessary to generate and send a unique web page back to the browser. At step 102 the web server receives the page request. At step 104 the unique serial number is generated comprising the provided serial number, the UTC date and time and the iteration count or process id as described earlier.

At step 106 the corporate web server sets a codebase for Java applet or cookie delivery. Applets or cookies may be used interchangeably in this embodiment of the invention. As the applet is the more complex, it will be described in detail. The manner in which the invention is implemented using cookies will be described later. The codebase is the absolute network location from which the applet or cookie is delivered and, in the case of the applet, forms part of the applet program. It ensures that secure connection may be made to the verification server.

At step 108 the corporate web server creates a web page in which is embedded the applet and the unique serial number. The applet will be described in greater detail later on.

At step 110 the newly created web page is sent to the user's Internet browser.

Thus at this stage, the user has sent a page request to the corporate web server which has replied with a web page which is unique to that request.

In practice, the user has merely clicked on a hypertext link to the corporation owning the corporate web server or entered the site's URL in the address field of the browser. The user's browser will not yet display anything from the corporate web server.

At step 112, the browser receives the web page from the corporate web server and at step 114 instantiates the applet embedded in the page. The applet then executes within the Java (or similar) environment.

At step 116 the Java applet extracts the document base for the current page. This is the absolute location, that is the network address and the page location of the document delivered over the World Wide Web. The (optional) embedded code base is then retrieved from the delivered page and the current user environment is noted. This latter process records the user network address for reporting.

Java (or similar mechanisms) support concurrent operation with a number of tasks running at the same time within its own environment. Each of these tasks is an execution thread. At step 118, the applet creates two new concurrent execution threads. New thread 1 handles graphics operations and new thread 2 handles communications with the verification server.

At step 120 thread 1 of the applet draws a background graphic frame. At step 122 thread 2 of the applet opens a secure connection to the verification server 16. At step 124 thread 2 sends the page serial number, network delivery, page addresses and current environment data to the verification server. This data may be sent in encrypted form. At step 126 thread 1 of the applet creates pending and clipping frames. The latter is a frame which defines an area of an image which requires updating. Any drawing requests falling outside that defined area will be ignored.

At step 128 thread 1 of the applet overlays the background, pending and clipping frames and at step 130 displays the composite frame and starts animation. The user will now see the composite frame displayed in their browser. While thread 1 of the applet is executing, the verification server, at 132 receives and accepts the secure connection request. At step 134 the request is analysed and a serverlet instantiated to enable multiple concurrent verification transactions. It will be appreciated that the system described considers only one user and one corporate server. In practice, the verification server will handle requests from many users relating to many corporate servers. The serverlet is a small Java based program running within the verification net server.

At step 136 the serverlet decodes the received data and stores it for later analysis and security exception reports. At step 138 the serverlet performs a Java Data Base Connectivity (JDBC) lookup to validate the data. Depending on the results of the lookup, the serverlet either generates an approved status with an embedded serial number at step 140 or a not approved status. In the latter case a non approved status is generated if the corporate server has an unknown address or the (optional) serial number is not available, or where the serial number is stale. Where the system is not approved a security exception is generated. At step 142 the serverlet returns the approval status to the user's Internet browser. At step 140 the serverlet closes and at step 142 the connection to the verification web server closes.

At step 144 the user's Internet browser receives the approval status and at step 146 thread 2 of the applet generates a "pass" or 'fail' graphic pane. If a "pass" is displayed, the (optional) serial number is also displayed. This pane overrides the pending frame becoming the middle layer of the animated logo. At step 148 thread 2 closes any active terminals, releases resources and terminates. At step 146 thread 1 enters an animation loop until the browser moves to another page or closes. The animation is displayed in the area defined by the clipping frame and may be a logo indicating that the corporate site is verified as authentic. At step 152 the applet releases all resources when the browser moves to another page or closes. The threads are stopped and any memory used is cleared. The applet then terminates.

Figure 3:
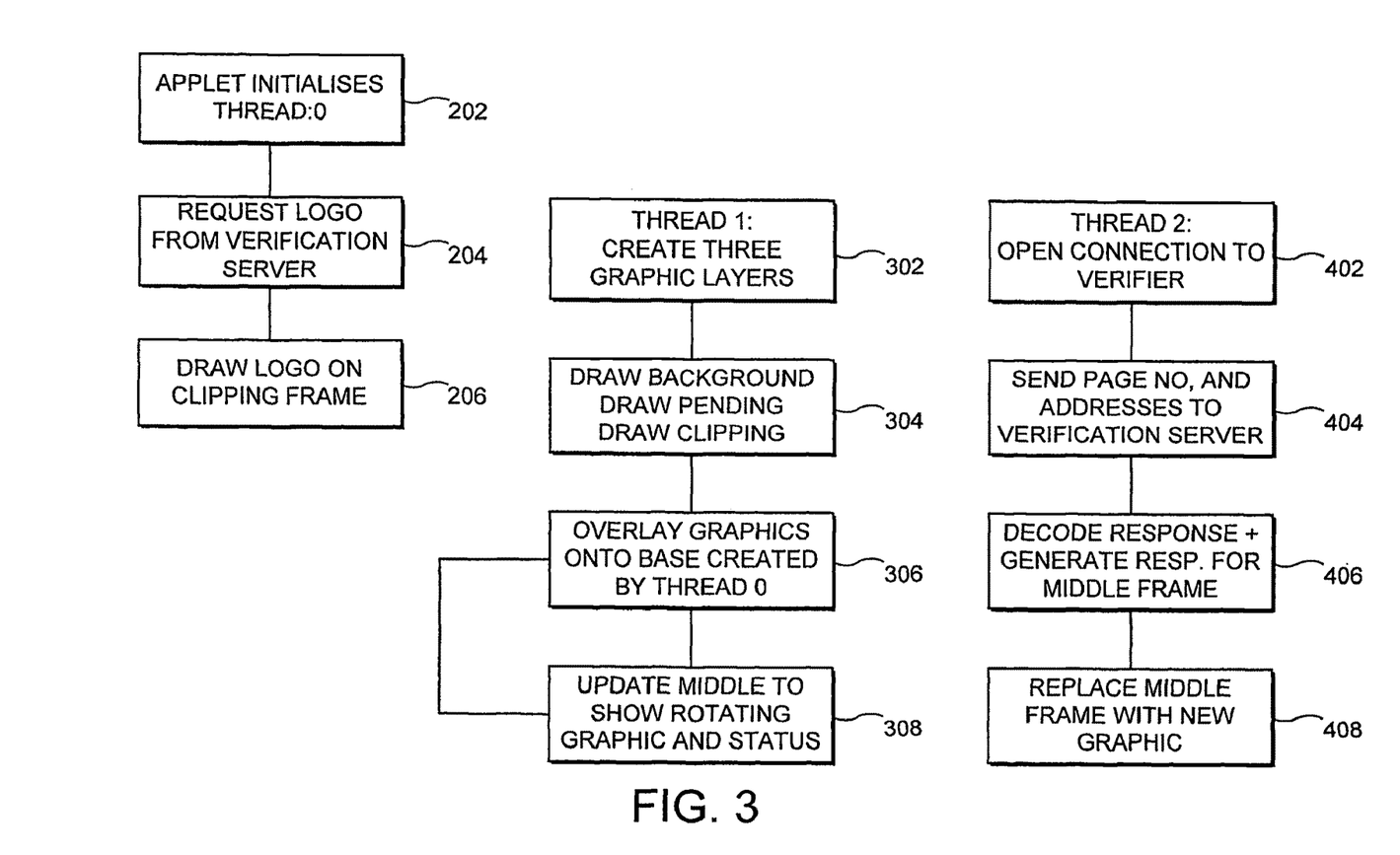
FIG. 3 is a block diagram illustrating the functionality the client applet or cookie.

The Java applet is illustrated in more detail in FIG. 3. As discussed in the foregoing, the applet comprises three threads: thread 0, thread 1 and thread 2. When the applet is first instantiated thread 0 is created automatically on the Java Virtual Machine which is resident on all web browsers within the browser environment. It instantiates the other two execution threads and creates the necessary components for the other threads to manipulate. The thread eventually loops through a graphic refresh request and a small 100 ms pause becoming the animation controller.

Figure 2A:
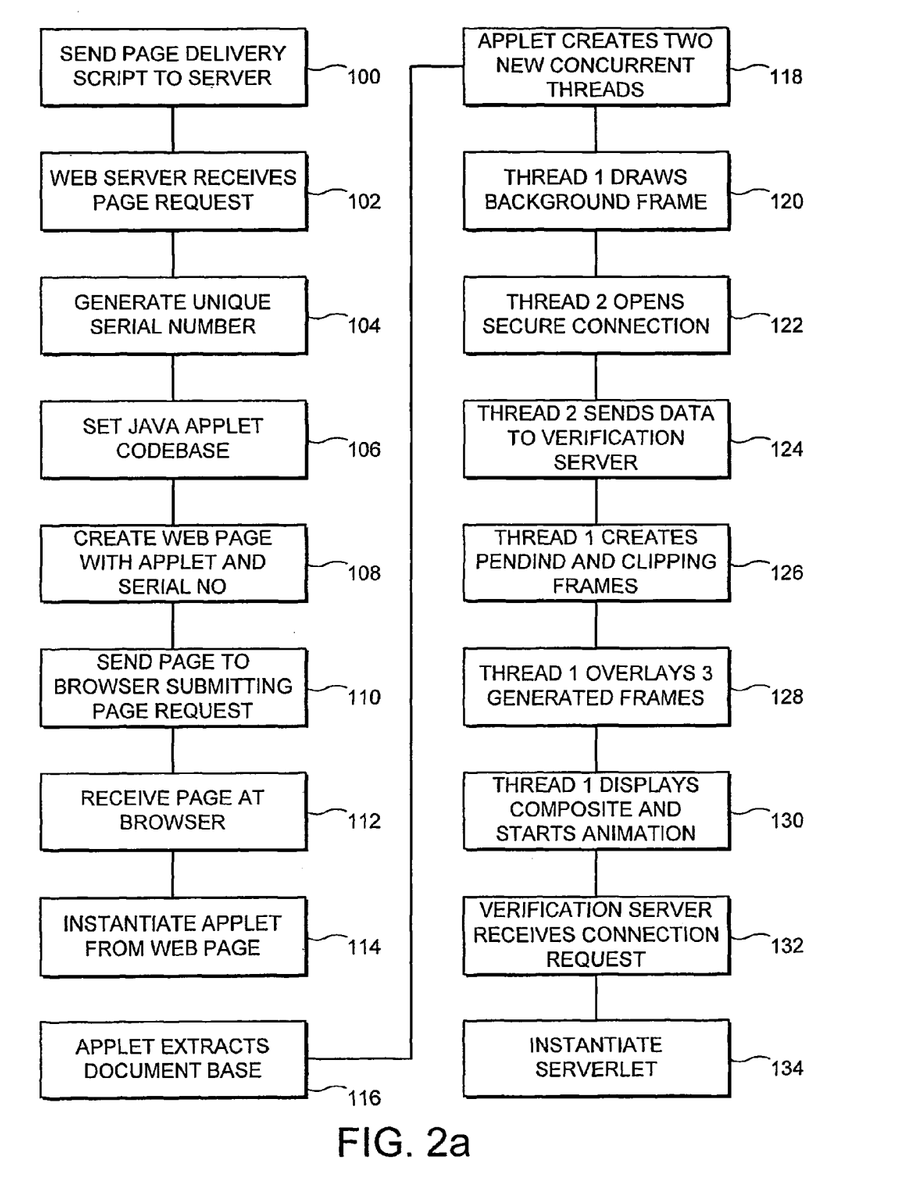
FIGS. 2a and 2b are a flow chart illustrating the process embodying the invention.
Figure 2B:
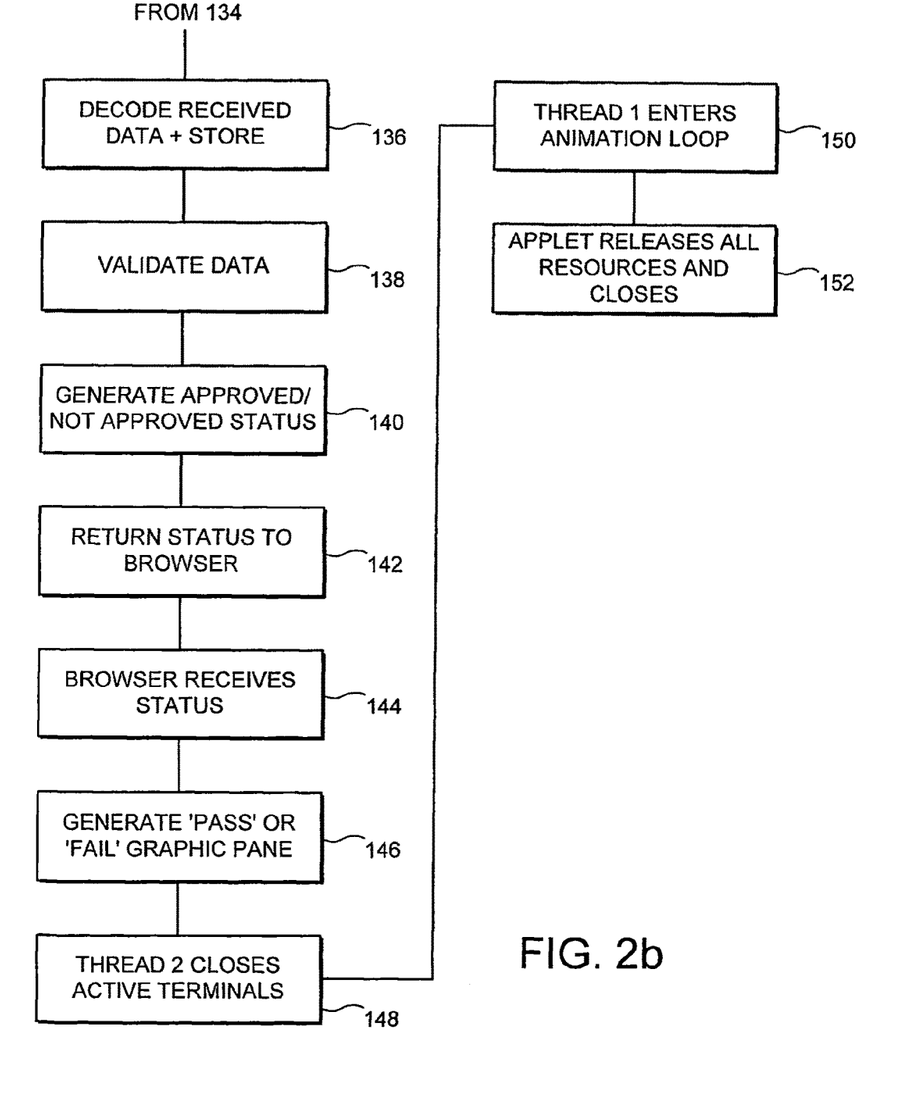

When the applet receives a termination request, thread 0 stops all other threads and the releases all resources before terminating itself (step 152, FIG. 2).

At step 202 thread 0 requests a logo component from the verification server and at step 204 the logo is drawn onto the clipping frame. Of course, the logo is only drawn if the site has been verified.

Thread 1, at step 300 creates three graphics frames. The thread is responsible for creating or updating the system graphics double buffer such that the applet is self animating. The graphics sub-system has three layers: a base frame which contains a shape such as a background rectangle, background and static imagery; a middle frame containing any moving imagery; and a top, clipping frame which limits the drawing area to a defined area as discussed previously. The three layers are re-assembled and repainted as one graphic image which becomes the image source for thread 0. Thus, in FIG. 3, the three layers are drawn at step 302 and overlayed onto the base graphic at step 304. The middle layer is updated at step 304, for example to show a rotating graphic and the current verification status. The final two steps are looped until the browser is closed or moves to a new page.

The third thread, thread 2, handles client-server communications and acquires the information required to validate a page. The thread replaces the middle frame used by thread 1 with an updated graphic once the main verification server has sent its response back to the applet. Thus, in FIG. 3 at step 400 thread 2 opens a connection to the verification server. At step 402 the unique page number, the delivery address and browser data are sent to the verification server and at step 404 the response is decoded and, according to the response, a new middle frame is generated. At step 406 the middle frame generated by thread 1 is replaced with the new graphic.

The verification server performs a database look up using JDBC to ensure that the details provided by the corporate server match. As the UTC and iteration count/process id are unique it is only the supplied serial number which is compared along with the codebase. If any inconsistencies are found the server sends a fail status back to the applet. If none are found a success status is returned.

Communications with the server are over a secure communication service which is well-known. As a new connection is established the server spawns a new task to deal with the incoming request, ensuring that each task cannot interfere with any other task and providing a mechanism to balance server loading over multiple back end machines.

Data inconsistencies or processing difficulties automatically generate a security exception. These are analysed at the verification server. Pattern matching techniques may be used to identify hacking activity. As each applet has an individual signature, misuse of an applet can be traced and an offending web or hacking site can be tracked.

Figure 4:
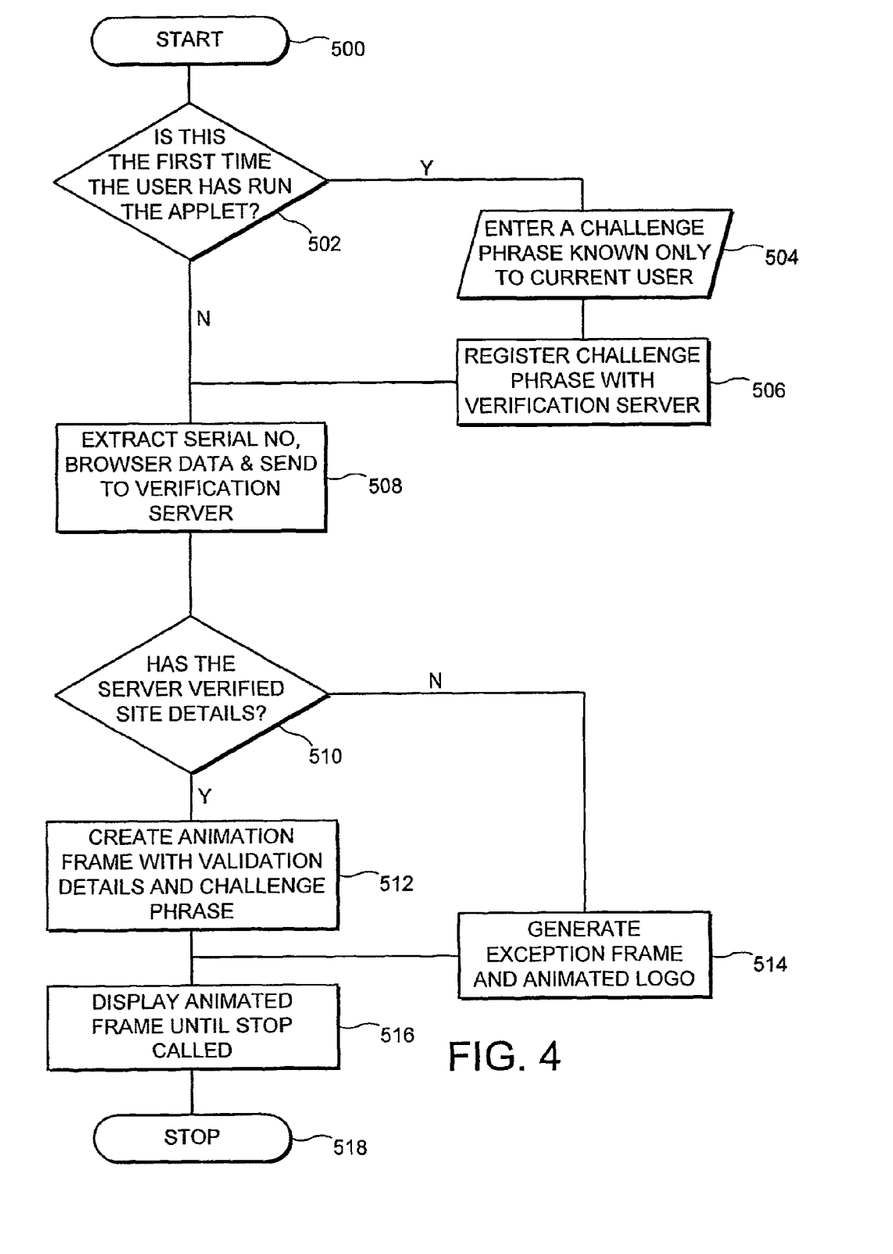
FIG. 4 is a flow chart illustrating the procedure executed by the applet or cookie.

In order to understand the applet process further, the pseudocode for the process running on the browser is as follows, where the reference numerals refer to FIG. 4.

```
START - 500
CHECK FOR PREVIOUS DETAILS - 502
IF PREVIOUS DETAILS NOT FOUND THEN
     INPUT CHALLENGE PHRASE - 504
     REGISTER CHALLENGE PHRASE WITH SERVER - 506
ENDIF
START ANIMATION THREAD
START COMMUNICATION THREAD
LOOP UNTIL STOP SIGNAL RECEIVED
    REDISPLAY ANIMATION THREAD FRAME
    IF POINTER WITHIN APPLET BOUNDS THEN
         DISPLAY FLOATING CHALLENGE PHRASE
    ENDIF
ENDLOOP
END
COMMUNICATION THREAD:
START
EXTRACT PAGE DETAILS AND BROWSER ENVIRONMENT - 508
SEND PAGE DETAILS AND BROWSER ENVIRONMENT TO
SERVER
AWAIT SERVER RESPONSE - 510
IF TIMEOUT OR SERVER VERIFICATION FAILURE THEN
    CALL VERIFICATION FAILURE IN ANIMATION THREAD
ELSE
```

-continued

```
    GET SERIAL NUMBER AND CHALLENGE PHRASE FROM
    RESPONSE
    CALL VERIFICATION SUCCESS IN ANIMATION THREAD
ENDIF
STOP - 518
ANIMATION THREAD
START
CREATE ANIMATION GRAPHIC FRAMES (3) - 512
CREATE BACKGROUND IN FRAME (0)
CREATE PENDING LOGO IN FRAME (1)
CREATE CLIPPING WINDOW IN FRAME (2)
LOOP:       - 516
    DRAW FRAME (0)
    OVERLAY FRAME (1)
    OVERLAY FRAME (2)
UNTIL STOP SIGNAL RECEIVED
ANIMATION THREAD: VERIFICATION FAILURE: 514
START
    CREATE FAILURE IMAGE IN FRAME (1)
END
ANIMATION THREAD VERIFICATION SUCCESS:
START
    CREATE VERIFICATION IMAGE IN FRAME (1)
END
```

As mentioned above, cookies and link mechanisms may be used in place of applets. Cookies and link mechanisms perform the process described in a similar manner except that most of the processing is carried out on the verification server. Thus, in FIG. 2, at step 108, link mechanism is embedded in the web page sent to the User's browser and at steps 114, 116 and 118 the web browser executes, extracts the document base and creates the concurrent execution threads respectively. The generation of the verification sign or logo and the accompanying challenge phrase are handled differently. Both are received from the verification server, as an image without having to be generated by an applet.

The manner in which challenge phrases are used in the embodiments described will now be described in greater detail. It will be appreciated from the discussion of the browser pseudo-code and FIG. 4 that a challenge phrase is registered with the verification server by the user when they first use the system. This is performed when the user signs up or subscribes to the verification system. The user is required to provide a challenge phrase; a code which may be viewed as a user originated identifier chosen by him. This is sent to the verification server and stored and the user is registered.

When an authentication is performed, the unique web page downloaded from the merchant includes an image tag, for example in HTML form. This may be in the form: <img src="http://www.trdesafely.com/image.gif">.

The user's browser downloads the image tags from the merchant. The user browser then generates a link to the verification server, the verification server asks a first time user to register giving his name and user defined challenge phrase or identifier. The verification server stores the user data and sends a cookie containing a unique ID to the user browser.

In cases of users already registered with the verification server, The user's browser downloads the image tags from the merchant. The user browser then generates a link to the verification server, the verification server looks at the merchants address (URL) or site identification and compares this with pre stored data. If the verification server recognises the address (URL) and/or site identification, it will generate an authentication signal to the user. The verification server also checks the user ID which is extracted from the cookie stored on the user's browser, and attaches the user defined identifier or challenge phrase to the authentication signal. This enables the user to be confident that verification has been properly performed by the correct verification server.

At the verification server, the referring page's URL is extracted, then the cookie having the user's unique ID is extracted. The verification server compares the referring URL address with a database of approved URL addresses and searches a database of registered users for the extracted user ID number and extracts the challenge phrase associated with it. The verification server then sends, preferably as an image, a response to the user which includes the challenge phrase.

The invention claimed is:

1. A method of verifying the authenticity of an Internet web site comprising the steps of:
using a verification server that comprises a processor to store data, wherein the data comprises:
approved site identifications associated with corresponding approved Internet web sites, and
user originated identifiers received from corresponding users during a registration process, wherein each user originated identifier is associated with a corresponding user ID that identifies a registered user, user originated identifier is separated from user ID; receiving, at the verification server, a request from a user interfacing at a user browser to authenticate the Internet web site, wherein the request includes a site identification associated with a web page of the Internet web site to be authenticated and a user ID associated with the user sending the request to authenticate the Internet web site at the verification server, comparing the received site identification associated with the web page of the Internet web site to be authenticated with the approved site identifications associated with the approved Internet web sites stored at the verification server;
identifying, from the user originated identifiers stored at the verification server, a user originated identifier that corresponds to the received user ID; and
based on the comparison, sending an indication from the verification server to the user whether or not the Internet web site is authentic, the indication including the identified user originated identifier that corresponds to the received user ID back to the user.

2. A method according to claim 1, wherein the received site identification includes a serial number and a uniform resource locator (URL) address extracted from the web page of the Internet web site to be authenticated.

3. A method according to claim 1, wherein the received site identification includes a unique identifier which is embedded in the web page of the Internet web site to be authenticated to form a unique web page.

4. A method according to claim 3, wherein the unique identifier includes an iteration count.

5. A method according to claim 3, wherein the unique identifier includes a process identification.

6. A method according to claim 4, wherein the unique identifier includes a universal date code.

7. A method according to claim 1, wherein the request that includes the site identification associated with the web page of the Internet web site to be authenticated is received from the user using an encrypted communication over a secure communication.

8. A method according to claim 1, wherein the web page of the Internet web site to be authenticated comprises an embedded applet.

9. A method according to claim 1, wherein the web page of the Internet web site to be authenticated comprises an embedded cookie.

10. A method according to claim 8, wherein the web page of the Internet web site to be authenticated comprises an embedded links to the verification server.

11. A method according to claim 1, wherein sending the indication to the user whether or not the site is authentic comprises generating an approved or not approved status and sending the generated status to the user browser.

12. A system for verifying the authenticity of an Internet web site comprising:
a verification server configured to verify the authenticity of the Internet web site, the verification server comprising:
a data repository of approved site identifications associated with corresponding approved Internet web sites, and
a data repository of user originated identifiers received from corresponding users during a registration process, wherein each user originated identifier is associated with a corresponding user ID that identifies a registered user, user originated identifier is separated from user ID; and
wherein the verification server is configured to receive, from a user operating a user device, a request to verify the authenticity of the Internet web site, wherein the request includes a site identification associated with a web page of the Internet web site to be authenticated and a user ID associated with the user sending the request to authenticate the Internet web site,
compare the received site identification associated with the web page of the Internet web site to be authenticated with the data repository of the approved Internet web sites;
identify, from the data repository of user originated identifiers, a user originated identifier that corresponds to the received user ID; and
send an indication to the user whether or not the Internet web site is authentic, based on the comparison, wherein the indication includes the identified user originated identifier that corresponds to the received user ID to the user.

13. A computer readable storage medium embodying a computer program comprising instructions to cause a data processing device to perform operations comprising:
storing data comprising:
approved site identifications associated with corresponding approved Internet web sites, and
user originated identifiers received from corresponding users during a registration process, wherein each user originated identifier is associated with a corresponding user ID identifying a registered user, user originated identifier is separated from user ID;
receiving a request from a user interfacing at a user browser to authentication an Internet web site, wherein the request includes a site identification associated with a web page of the Internet web site to be authenticated and a user ID associated with the user sending the request to authenticate the Internet web site;
comparing the received site identification associated with the web page of the Internet web site to be authenticated with the stored approved site identifications associated with the approved Internet web sites;
identifying, from the stored user originated identifiers, a user originated identifier that corresponds to the received user ID; and
sending to the user an indication of whether or not the Internet web site is authentic based on the comparison: wherein the indication includes the identified user originated identifier that corresponds to the received user ID.

14. The computer readable storage medium according to claim 13, wherein the received site identification associated with the web page of the Internet web site to be authenticated includes a serial number and a uniform resource locator (URL) address extracted from the web page of the Internet web site to be authenticated.

15. The computer readable storage medium according to claim 13, wherein the received site identification includes a unique identifier which is embedded in the web page to form a unique web page.

16. The computer readable storage medium according to claim 15, wherein the unique identifier includes a universal date code, and either an iteration count or a process iteration count.

17. The computer readable storage medium according claim 13, wherein the web page includes embedding an embedded applet.

18. The system of claim 12, wherein the received site identification associated with the web page of the Internet web site to be authenticated includes a serial number and a uniform resource locator (URL) address extracted from the web page of the Internet web site to be authenticated.

19. The system of claim 12, wherein the received site identification includes a unique identifier which is embedded in the web page to form a unique web page.

20. The system of claim 19, wherein the unique identifier includes a universal date code, and either an iteration count or a process iteration count.

21. The system of claim 12, wherein the web page includes an embedded applet.

* * * * *

UNITED STATES PATENT AND TRADEMARK OFFICE
CERTIFICATE OF CORRECTION

PATENT NO.       : 7,739,512 B2
APPLICATION NO.  : 10/204806
DATED            : June 15, 2010
INVENTOR(S)      : Michael Hawkes It is certified that error appears in the above-identified patent and that said Letters Patent is hereby corrected as shown below:

Column 9, line 28 (Claim 1) delete "site" and insert --site;--;
Column 10, line 63 (Claim 13) delete "comparison:" and insert --comparison,--;
Column 11, line 14 (Claim 17) before "claim" insert --to--;
Column 11, line 14 (Claim 17) after "includes" delete "embedding" .

Signed and Sealed this
Tenth Day of May, 2011

David J. Kappos
*Director of the United States Patent and Trademark Office*